United States Patent
DeGelis

(10) Patent No.: US 8,061,948 B2
(45) Date of Patent: Nov. 22, 2011

(54) DEVICE FOR FASTENING AN ADD-ON PART AND A SUPPORT PART AT A DISTANCE FROM EACH OTHER

(75) Inventor: Vincent DeGelis, Grenoble (FR)

(73) Assignee: A. Raymond et Cie, Grenoble (FR)

( * ) Notice: Subject to any disclaimer, the term of this patent is extended or adjusted under 35 U.S.C. 154(b) by 383 days.

(21) Appl. No.: 12/299,973

(22) PCT Filed: Jun. 28, 2007

(86) PCT No.: PCT/EP2007/005704
§ 371 (c)(1), (2), (4) Date: Nov. 7, 2008

(87) PCT Pub. No.: WO2008/011950
PCT Pub. Date: Jan. 31, 2008

(65) Prior Publication Data
US 2009/0190993 A1    Jul. 30, 2009

(30) Foreign Application Priority Data
Jul. 26, 2006 (DE) .......................... 10 2006 034 463

(51) Int. Cl.
*F16B 43/02* (2006.01)
(52) U.S. Cl. ............ 411/546; 411/32; 411/45; 411/522; 411/970
(58) Field of Classification Search .................. 411/1, 6, 411/30, 32, 44, 45, 59, 60.1–60.3, 349, 357, 411/508–510, 522–523, 533, 535–536, 546, 411/970; 403/22; 24/289–295, 297
See application file for complete search history.

(56) References Cited

U.S. PATENT DOCUMENTS

| | | | | | |
|---|---|---|---|---|---|
| 3,197,854 | A | * | 8/1965 | Rohe et al. | 29/525.06 |
| 4,728,236 | A | * | 3/1988 | Kraus | 411/437 |
| 4,999,019 | A | * | 3/1991 | Kraus | 411/512 |
| 5,297,322 | A | * | 3/1994 | Kraus | 24/662 |
| 5,302,070 | A | * | 4/1994 | Kameyama et al. | 411/437 |
| 5,645,282 | A | * | 7/1997 | Belter | 277/598 |

(Continued)

FOREIGN PATENT DOCUMENTS

DE       202005009017 U1    8/2005

(Continued)

*Primary Examiner* — Victor Batson
*Assistant Examiner* — Roberta Delisle
(74) *Attorney, Agent, or Firm* — Baker & Daniels LLP

(57) ABSTRACT

A device for fastening an add-on part (23) and a support part (24) at a distance from each other has a mounting nut (1) comprising an internal thread (9) of a first direction of thread, a compensating bush (5) comprising an external thread (8) that is adjusted to the internal thread (9), and a fastening screw (26), wherein its screw shaft (25) is configured having an external thread (27) of a second direction of thread opposite of the first direction of thread. The compensating bush (5) is configured having an internal sleeve (13) comprising a head section (15) having an arrangement of reinforcement zones (17) and adaptation zones (18), wherein the reinforcement zones (17) have a larger resistance than the adaptation zones (18) as opposed to an expansion directed radially outward. In this manner, relatively low tightening torques, as well as a relatively large variability in the material selection, are achieved even with relatively large tolerances between the diameters of the channel section of the compensating bush and the screw shaft.

3 Claims, 4 Drawing Sheets

U.S. PATENT DOCUMENTS

| | | | |
|---|---|---|---|
| 5,816,762 A * | 10/1998 | Miura et al. | 411/433 |
| 5,906,464 A * | 5/1999 | Wedenig | 411/433 |
| 6,357,953 B1 | 3/2002 | Ballantyne | |
| 7,114,901 B2 * | 10/2006 | Maruyama et al. | 411/353 |
| 7,226,263 B2 * | 6/2007 | Schwarzbich | 411/546 |
| 2006/0280579 A1 | 12/2006 | Seidl et al. | |

FOREIGN PATENT DOCUMENTS

| | | |
|---|---|---|
| DE | 102004061087 A1 | 7/2006 |
| WO | WO2006/063634 A1 | 6/2006 |

* cited by examiner

DEVICE FOR FASTENING AN ADD-ON PART AND A SUPPORT PART AT A DISTANCE FROM EACH OTHER

CROSS-REFERENCE TO RELATED APPLICATION

This application is a U.S. National Phase Patent Application based on International Application Serial No. PCT/EP2007/005704 filed Jun. 28, 2007, the disclosure of which is hereby explicitly incorporated by reference herein.

BACKGROUND OF THE INVENTION

1. Field of the Invention

The present invention is directed to a device for fastening an add-on part and a support part at a distance from each other.

2. Description of the Related Art

One device is known from U.S. Pat. No. 6,357,953 B1. The prior device for securing an add-on part and a support part in spaced-apart relation comprises a mounting nut that is fixedly connectable to the support part and has an internal thread of a first pitch direction. Also provided is a compensating bush having an external thread that mates with the internal thread of the mounting nut, said compensating bush being screwable into the mounting nut.

SUMMARY OF THE INVENTION

The add-on part is connectable to the compensating bush by means of a fastening screw having a screw shaft, said screw shaft being configured with an external thread of a second pitch direction opposite to the first pitch direction and being insertable in a screw channel made to pass through the mounting nut and into the compensating bush. The compensating bush has a channel portion that forms part of the screw channel and whose inner diameter is smaller than the outer diameter of the screw shaft.

The screw shaft is made of a harder material than the compensating bush, such that the screw shaft, when rotated into the channel portion of the compensating bush, initially cuts a thread in said channel portion until the torque needed for this purpose becomes greater than the torque needed to turn the compensating bush in the opposite direction and thus remove it from the mounting nut. Once the compensating bush is in abutment with the add-on part, the cutting of the thread by the screw shaft continues into the channel portion of the compensating bush until the add-on part is fixedly connected to the support part.

The present invention provides a device for fastening an add-on part and a support part at a distance from each other that is distinguished by relatively low tightening torques and by a relatively large variability in the choice of material for the fastening screw and the compensating bush, even in the presence of relatively large tolerances between the diameter of the channel portion of the compensating bush and the diameter of the screw shaft of the fastening screw.

By virtue of the fact that in the inventive device, the compensating bush comprises a head portion having an alternating sequence of zones with a relatively high resistance to radial expansion and zones with, compared thereto, a relatively low resistance to radial expansion, the head portion that comes into engagement with the screw shaft has a certain flexibility that compensates for tolerances and also permits the use of materials for the fastening screw and the compensating bush that are relatively similar in terms of their mechanical properties.

In one form of thereof, the present invention provides a device for securing an add-on part and a support part in spaced-apart relation, including a mounting nut that is fixedly connectable to the support part and has an internal thread of a first pitch direction; a compensating bush having an external thread that mates with the inner thread of the mounting nut, the compensating bush being screwable into the mounting nut; and a fastening screw having a screw shaft and serving to connect the add-on part to the compensating bush, the screw shaft being configured with an external thread of a second pitch direction opposite to the first pitch direction and being insertable in a screw channel provided in the mounting nut and in the compensating bush, and the compensating bush having a channel portion that forms part of the screw channel and whose inner diameter is smaller than the outer diameter of the screw shaft, characterized in that the compensating bush is configured with an inwardly disposed inner sleeve including a head portion with an alternating arrangement of reinforcement zones and adaptation zones, the reinforcement zones having a greater resistance to radially outwardly directed expansion than the adaptation zones.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
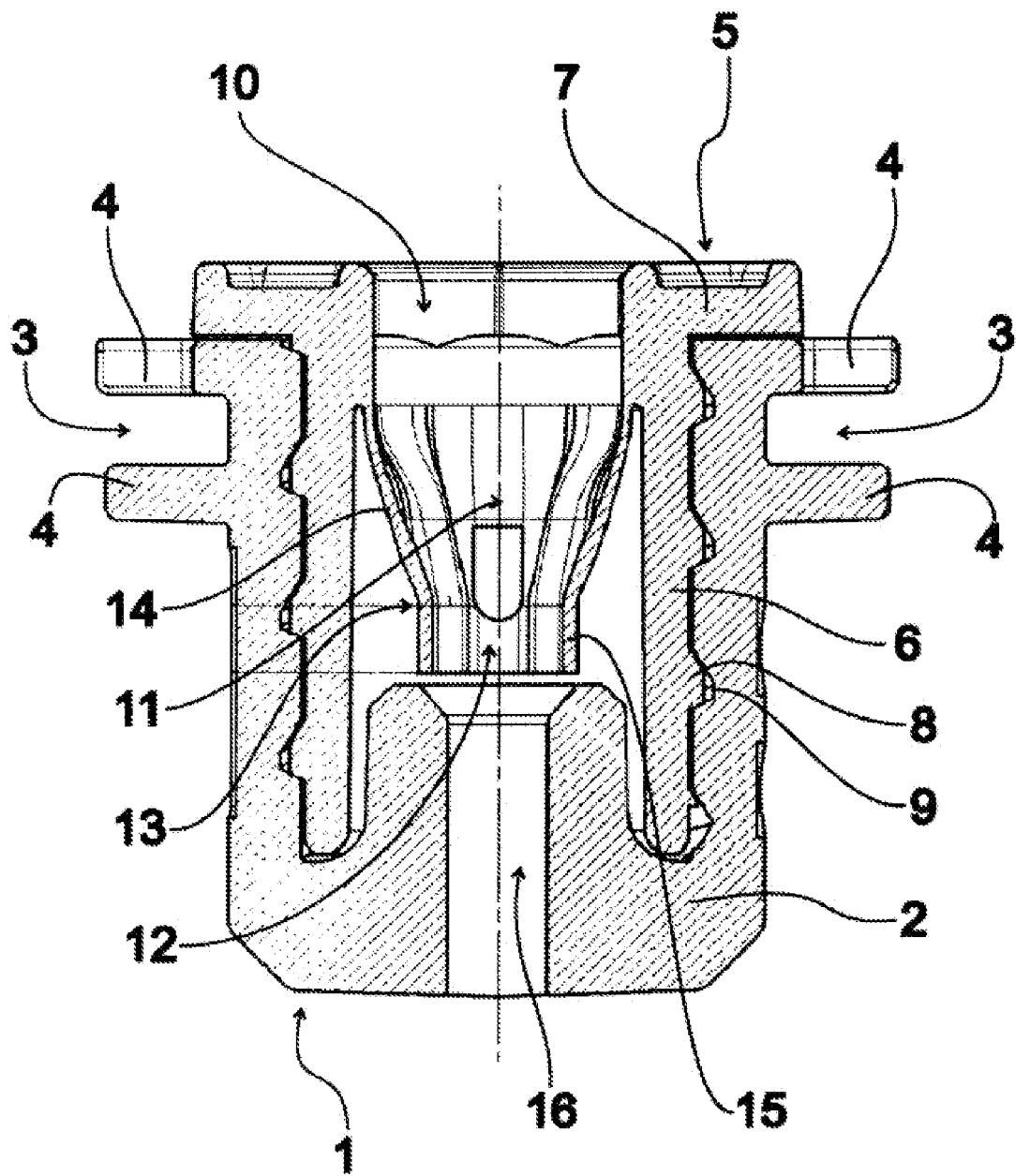
FIG. 1 is a sectional view of a mounting nut and a compensating bush in one exemplary embodiment of a device according to the invention.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 is a perspective representation of an exemplary embodiment of a device according to the invention, comprising a mounting nut 1 made of a plastic material and having a substantially cylindrical nut body 2. Configured on the outer face of the nut body 2 are a number of abutment projections 4 that protrude radially outward and are arranged in oppositely disposed pairs to one and the other side of clearances 3.

Also depicted in FIG. 1 is a compensating bush 5, made of a plastic material and configured with an also substantially cylindrical bush body 6 and with an abutment plate 7 formed at one end of bush body 6 and extending radially beyond bush body 6. Configured on the outer face of bush body 6 is an external thread 8 of a first pitch direction, which in the arrangement of FIG. 1 is screwed into an internal thread 9 that is configured in mounting nut 1 and is configured on the inner face of nut body 2 with the first pitch direction and matably with the external thread 8 of the bush body 6.

The device according to the invention is configured with a screw channel 10, which extends axially through the bush body 6 of the compensating bush 5 and has an entry portion 11 that tapers down, funnel-like, away from abutment plate 7, and, adjoining said entry portion 11, a first channel portion 12 surrounded by an inner sleeve 13.

Inner sleeve 13 is formed onto bush head 6 on the side proximate abutment plate 7 and extends away from abutment plate 7. Inner sleeve 13 comprises a foot portion 14, which tapers conically according to the shape of entry portion 11 and is formed onto bush body 6 in the region of bush body 6 adjacent to abutment plate 7. At the opposite end from abutment plate 7, inner sleeve 13 is configured with a head portion 15, which, in prolongation of first channel portion 12, is disposed opposite a second channel portion 16 that is part of screw channel 10 and is configured in nut body 2. In this exemplary embodiment, second channel portion 16 is configured as cylindrical and smooth-walled for ease of production.

Figure 2:
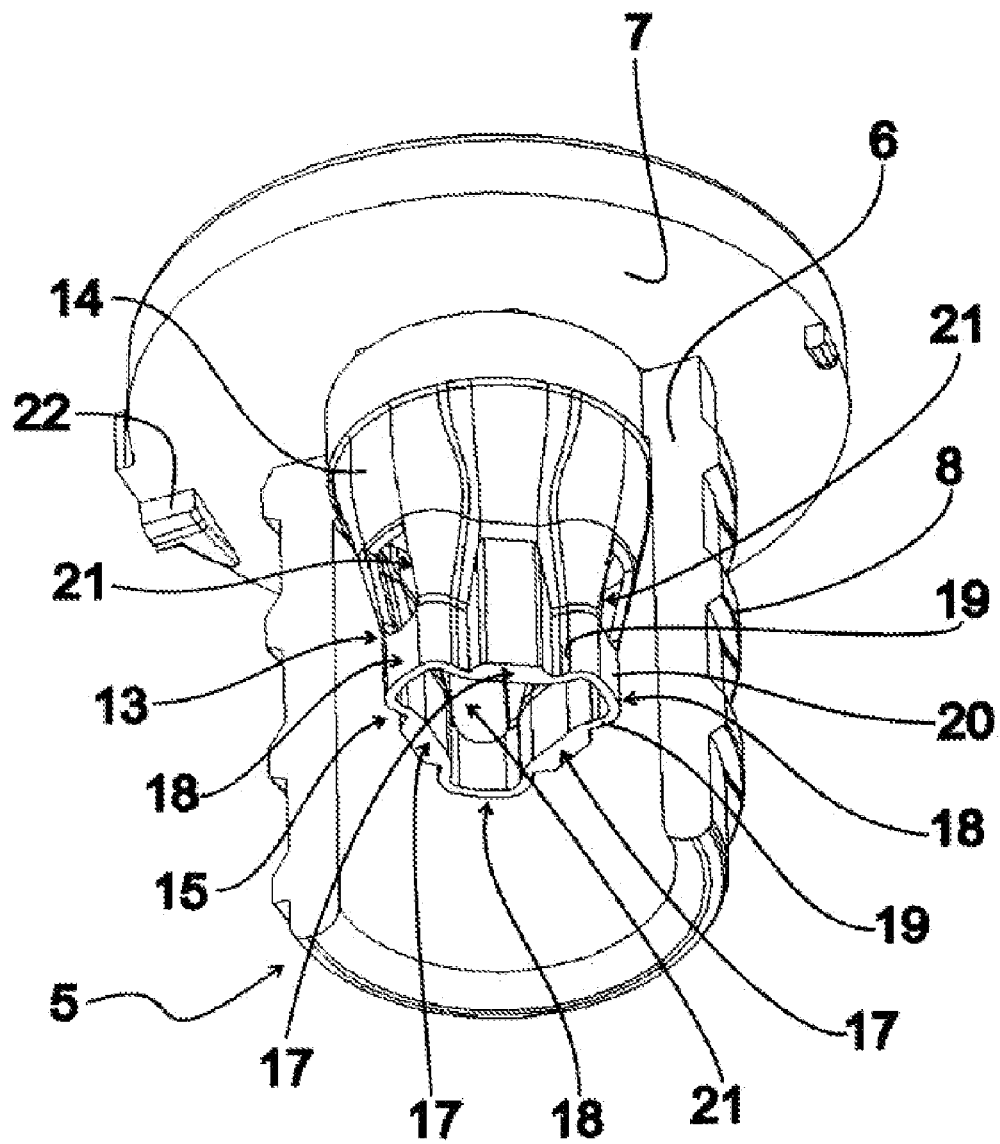
FIG. 2 is a partially cut-away perspective view of the compensating bush from the exemplary embodiment according to FIG. 1.

FIG. 2 is a partially cut-away perspective view of the compensating bush 5 from the exemplary embodiment according to FIG. 1. It can be seen from FIG. 2 that head portion 15 is provided with an alternating arrangement of materially thickened reinforcement zones 17 and, disposed between said reinforcement zones 17, adaptation zones 18 of a U-like configuration. The adaptation zones 18 are each implemented with two side legs 19 and a base segment 20, said side legs 19 each being joined to a respective adjacent reinforcement zone 17 and said base segments 20 being disposed farther outward radially than said reinforcement zones 17. The reinforcement zones 17 thus have a greater resistance to radially outwardly directed expansion than the adaptation zones 18, while still being relatively movable by comparatively easy-to-execute deformation of the adaptation zones 18.

Foot portion 14 comprises a number of weakening apertures 21, disposed opposite the adaptation zones 18 in the longitudinal direction, to increase the flexibility of head portion 15 in the region of the adaptation zones 18.

Finally, it can be understood from FIG. 2 that in the described exemplary embodiment a first rotation stop 22 is configured on abutment plate 7, on the side thereof facing bush head 6, and cooperates with a second rotation stop (not shown in the figures), which is configured on mounting nut 1, to definedly limit the rotation of bush body 6 into nut body 2.

Figure 3:
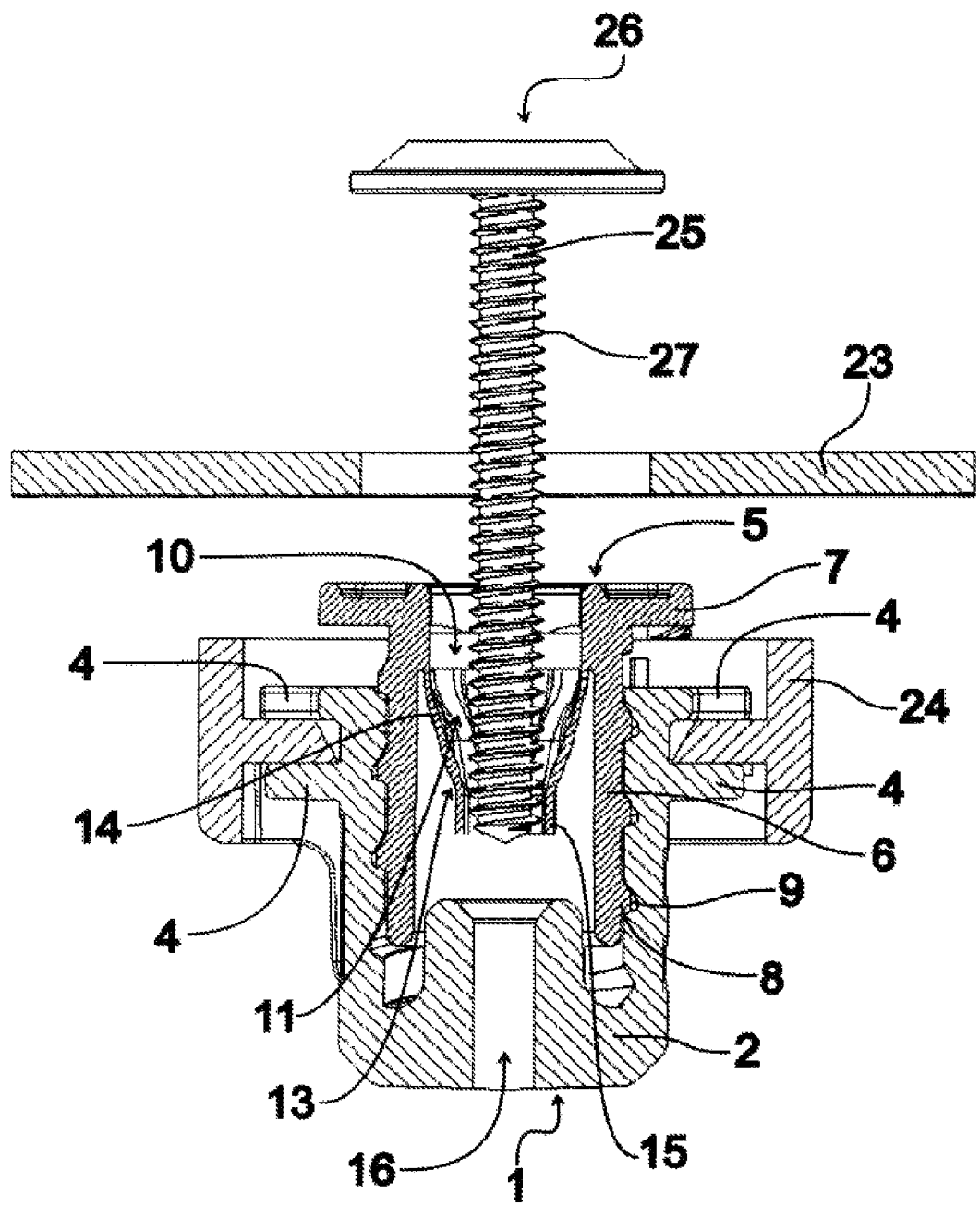
FIG. 3 is a sectional view of the exemplary embodiment according to FIGS. 1 and 2 with a compensating bush partially screwed out of the mounting nut.

FIG. 3 is a sectional view of the exemplary embodiment according to FIGS. 1 and 2 in use in securing an add-on part 23 in spaced relation from a support part 24, to which the mounting nut 1 is applied by force-locking and/or by form-locking, a screw shaft 25 of a fastening screw 26 being in the process of being screwed in and a compensating bush 5 being screwed partway out of the mounting nut 1. The screw shaft 25 is configured with an external thread 27 of a second pitch direction that is opposite to the first pitch direction of the thread arrangement configured between the mounting nut 1 and the compensating bush 5. The fastening screw 26 is made of a harder material than the mounting nut 1 and the compensating bush 5, such as a metal, for example, or a harder plastic than that used to produce the mounting nut 1 and the compensating bush 5.

The outer diameter of the screw shaft 25 of fastening screw 26 is greater than the smallest inner diameter of both the head portion 15 of inner sleeve 13 and the second channel portion 16 of nut body 2, such that when the external thread 27 of fastening screw 26 engages with the thread portion 15 of inner sleeve 13, after a given torque is exceeded, compensating bush 5 rotates out of mounting nut 1 against the direction of rotation of fastening screw 26 and moves in the axial direction toward add-on part 23. Depending on the hardness of the materials used for compensating bush 5 and fastening screw 26, the result is a more or less incisive cutting of thread into head portion 15, accompanied by a more or less forceful radial pressing of the reinforcement zones 17 against screw shaft 25.

As soon as the abutment plate 7 of compensating bush 5 comes into abutment with the side of add-on part 23 facing toward support part 24 and as fastening screw 26 continues to turn, the screw shaft 25 passes all the way through head portion 15 and keeps moving in the direction of second channel portion 16 configured in the nut body 2 of mounting nut 1.

Figure 4:
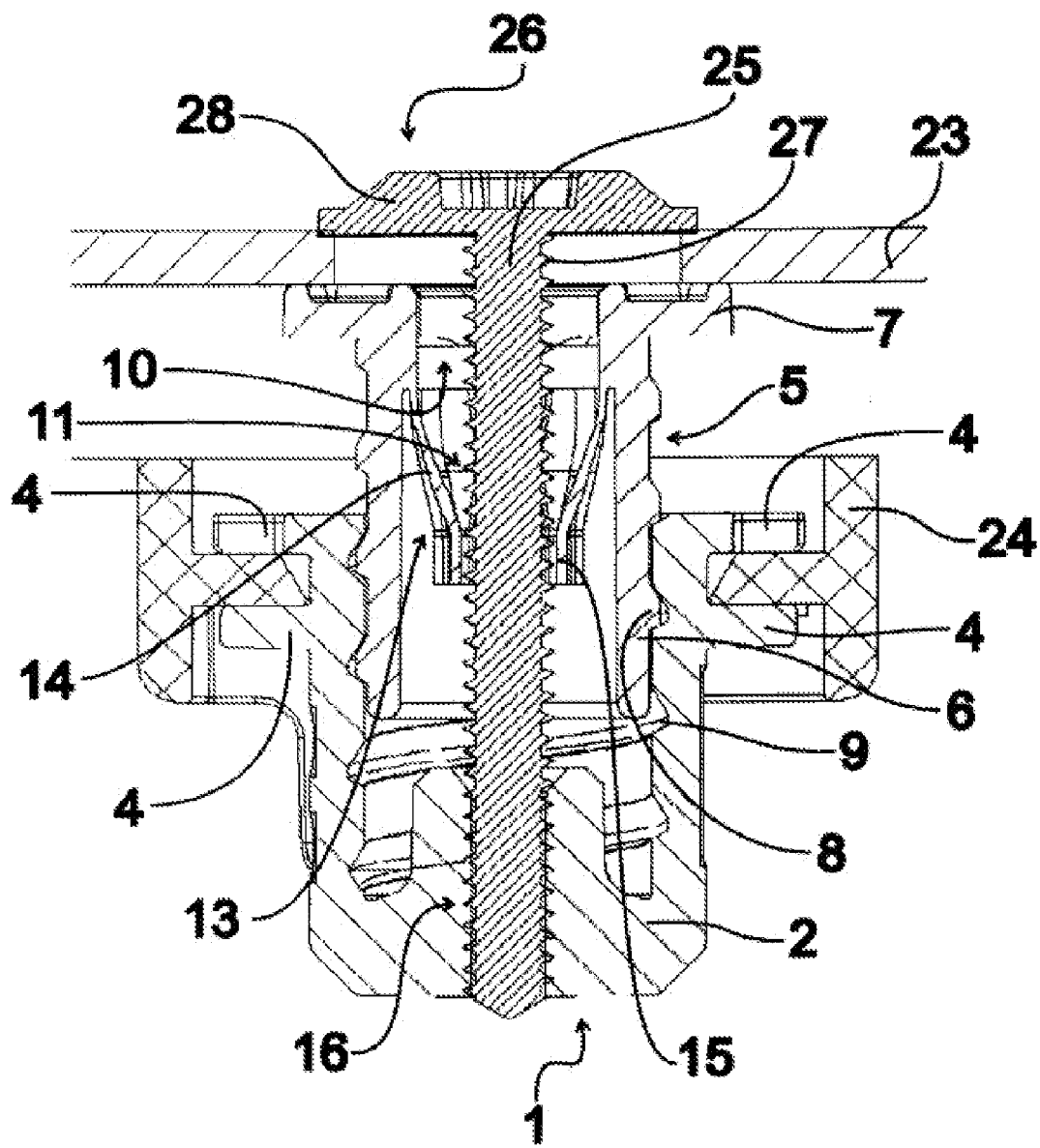
FIG. 4 is a longitudinal sectional view of the exemplary embodiment according to FIGS. 1 to 3 in a final assembled position, in which a fastening screw is screwed into both the compensating bush and the mounting nut.

FIG. 4 is a longitudinal sectional view of the exemplary embodiment according to FIGS. 1 to 3 in a final assembled position, in which the fastening screw 26 is screwed into both compensating bush 5 and mounting nut 1, and a screw head 28 of fastening screw 26 is in abutment with the opposite side of add-on part 23 from support part 24. In this arrangement, compensating bush 5 is rotated out of mounting nut 1 as far as it will go and butts by its abutment plate 7 against the side of add-on part 23 facing support part 24, causing add-on part 23 to be arranged in spaced relation to support part 24.

In the final assembled position, screw shaft 25 engages in second channel portion 16 of the nut body 2 of mounting nut 1, thereby forming an external thread, in which process the external thread 27 of fastening screw 26 is deformed to a greater or lesser extent or not at all, depending on the material of fastening screw 26. In this way, the spacing between add-on part 23 and support part 24 is locked in non-variably, since if the add-on part 23 moves away from the support part 24, the load is taken up by the thread configured between screw shaft 25 and second channel portion 16, whereas if the add-on part 23 moves toward the support part 24, unintentional backward rotation of the compensating bush 5 toward the mounting nut 1 is prevented by the relatively high friction between screw shaft 25 and head portion 15.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A device for use in securing an add-on part and a support part in mutually spaced-apart relation, said device comprising:
   a mounting nut fixedly connectable to the support part and having an internal thread of a first pitch direction;
   a compensating bush comprising:
     an external thread matable with said internal thread of said mounting nut;
     an inwardly disposed inner sleeve having a head portion with an alternating arrangement of reinforcement zones and adaptation zones, said reinforcement zones having a relatively greater resistance to radially outwardly directed expansion than said adaptation zones, said inner sleeve formed on said bush body on a side of said bush body proximate an abutment plate, said abutment plate disposed at an end of said compensating bush which is directed away from said mounting nut and projecting radially beyond said external thread of said compensating bush, wherein said adaptation zones are each U-shaped, including two side legs and a base segment, said side legs each joined to a respective adjacent reinforcement zone, and said base segment disposed farther radially outwardly than said reinforcement zones; and a foot portion extending between said head portion and said abutment plate, said foot portion tapering down conically from said abutment plate to said head portion and including a plurality of weakening apertures disposed opposite said adaptation zones in a longitudinal direction; and a fastening screw having a screw shaft to connect the add-on part to said compensating bush, said screw shaft including an external thread of a second pitch direction opposite to said first pitch direction and being insertable in a screw channel provided in said mounting nut and in said compensating bush, said compensating bush further having a channel portion forming part of said screw channel and having an inner diameter smaller than the outer diameter of said screw shaft.

2. The device of claim 1, wherein said reinforcement zones have a greater material thickness than said adaptation zones.

3. The device of claim 1, wherein said mounting nut is made of a plastic material that is relatively soft with respect to said screw shaft, said mounting nut including a channel portion forming part of said screw channel and having an inner diameter smaller than said outer diameter of said screw shaft, whereby an inner thread may be formed in said channel portion of said mounting nut by said outer thread of said screw shaft of said fastening screw.

* * * * *